United States Patent
Hotta

(10) Patent No.: US 9,561,802 B2
(45) Date of Patent: Feb. 7, 2017

(54) CONTROL APPARATUS FOR VEHICLE

(71) Applicant: Toyota Jidosha Kabushiki Kaisha, Toyota-shi Aichi-ken (JP)

(72) Inventor: Shintaro Hotta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/718,454

(22) Filed: May 21, 2015

(65) Prior Publication Data
US 2015/0353092 A1  Dec. 10, 2015

(30) Foreign Application Priority Data

Jun. 5, 2014 (JP) .................................. 2014-116961

(51) Int. Cl.
| B60W 10/06 | (2006.01) |
| B60W 30/188 | (2012.01) |
| F02D 41/00 | (2006.01) |
| B60W 10/101 | (2012.01) |
| F02D 41/10 | (2006.01) |
| F02D 41/30 | (2006.01) |
| F02D 41/02 | (2006.01) |

(52) U.S. Cl.
CPC .......... B60W 30/1882 (2013.01); B60W 10/06 (2013.01); B60W 10/101 (2013.01); F02D 41/0007 (2013.01); F02D 41/10 (2013.01); F02D 41/3017 (2013.01); *B60W 2710/0622* (2013.01); *F02D 41/0225* (2013.01); *F02D 2200/0406* (2013.01); *Y02T 10/144* (2013.01)

(58) Field of Classification Search
CPC  B60W 10/06; B60W 10/101; B60W 30/1882; F02D 41/0007; F02D 41/10
See application file for complete search history.

(56) References Cited

U.S. PATENT DOCUMENTS

2002/0038654 A1 *  4/2002  Sasaki .................... B60K 6/485
                                                                      123/568.11
2003/0022753 A1 *  1/2003  Mizuno ................. B60W 10/06
                                                                            477/43

(Continued)

FOREIGN PATENT DOCUMENTS

JP   H7-156691 A   6/1995
JP   H10-274070 A  10/1998

(Continued)

*Primary Examiner* — Huan Le
(74) *Attorney, Agent, or Firm* — Dinsmore & Shohl LLP

(57) ABSTRACT

If operation mode of an engine is transitioned from natural aspiration lean-burn operation mode to supercharged lean-burn operation mode, an engine control portion temporarily changes an air-fuel ratio from a lean air-fuel ratio to a stoichiometric air-fuel ratio or a rich air-fuel ratio. When the air-fuel ratio is changed from the lean air-fuel ratio to the stoichiometric air-fuel ratio or the rich air-fuel ratio by the engine control portion, a transmission control portion switches a gear ratio of the automatic transmission to a gear ratio that provides an engine rotational speed at which the engine output becomes equal to an engine output before the air-fuel ratio is changed and also at which an intake pipe pressure becomes equal to or closest to an intake pipe pressure before the air-fuel ratio is changed.

6 Claims, 8 Drawing Sheets

(56) References Cited

U.S. PATENT DOCUMENTS

| | | | |
|---|---|---|---|
| 2003/0060328 A1* | 3/2003 | Beaty | B60W 10/06 477/109 |
| 2012/0265421 A1* | 10/2012 | Livshiz | B60W 10/06 701/102 |
| 2012/0283931 A1* | 11/2012 | Otsuka | B60W 30/1882 701/103 |
| 2015/0184587 A1 | 7/2015 | Komiya et al. | |

FOREIGN PATENT DOCUMENTS

| | | |
|---|---|---|
| JP | 2002-106703 A | 4/2002 |
| JP | 2013-119832 A | 6/2013 |
| WO | 2014/013814 A1 | 1/2014 |

* cited by examiner

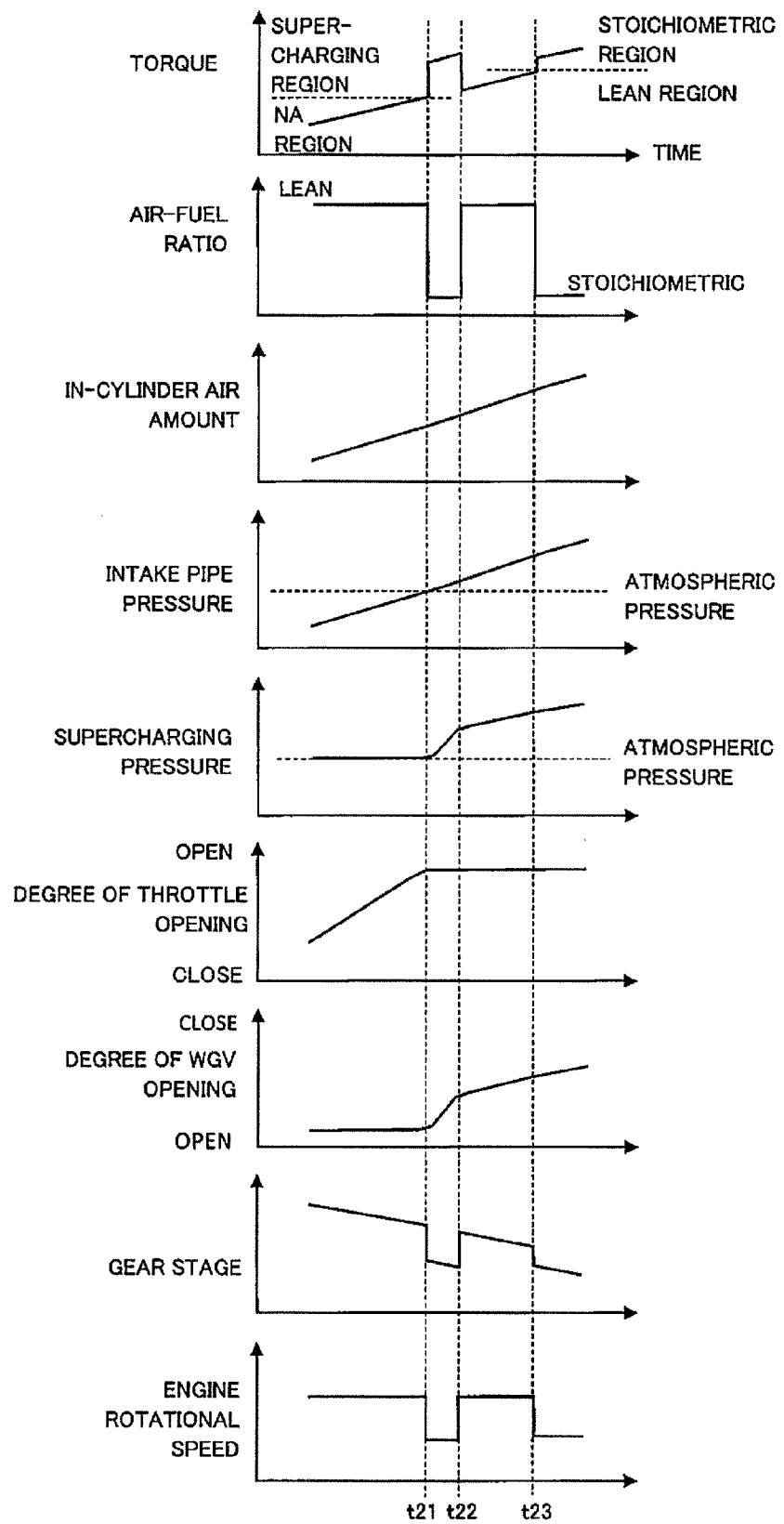

CONTROL APPARATUS FOR VEHICLE

BACKGROUND

Field of the Application

The present invention relates to a control apparatus for a vehicle including an engine with a turbocharger that is capable of lean-burn operation, and an automatic transmission.

Background Art

As disclosed in Japanese Patent Laid-Open No. 2013-119832, an engine with a turbocharger that is capable of lean-burn operation is known as an engine for a vehicle. Lean-burn operation can be performed in both a supercharging region in which supercharging is performed by a turbocharger, and a natural aspiration region in which supercharging is not performed. Hereunder, an operation mode of an engine that performs lean-burn operation in a supercharging region is referred to as a "supercharged lean-burn operation mode", and an operation mode of an engine that performs lean-burn operation in a natural aspiration region is referred to as a "natural aspiration lean-burn operation mode".

Other prior art includes Japanese Patent Laid-Open No. 2002-106703.

In a vehicle equipped with the above described engine, selection of an operation mode of the engine is performed in accordance with the engine output that a driver requests. For example, the natural aspiration lean-burn operation mode is selected when the driver requests a small engine output, such as when travelling at a low speed. Subsequently, when accelerating from the state in which the vehicle is travelling at a low speed, a transition from the natural aspiration lean-burn operation mode to the supercharged lean-burn operation mode is performed to increase the engine torque in accordance with an increase in the engine output requested by the driver.

In this connection, during lean-burn operation the energy (referred to as "exhaust energy") of exhaust gas is less than during stoichiometric-burn operation, and the rotational speed of a turbine does not rapidly increase even when a supercharging region has been entered. Consequently, when transitioning from the natural aspiration lean-burn operation mode to the supercharged lean-burn operation mode, a delay arises with respect to an increase in the intake pipe pressure, and due to a torque response delay (that is, a delay in the response of the actual torque with respect to the target torque) that arises accompanying the aforementioned delay, there is a risk of fluctuations or discontinuities arising in the engine output. Fluctuations or discontinuities in the engine output cause a deterioration in the drivability of the vehicle.

SUMMARY

The present invention has been conceived in view of the above described problem, and an object of the present invention is to provide a control apparatus that, when transitioning from a natural aspiration lean-burn operation mode to a supercharged lean-burn operation mode, can control the engine and the automatic transmission so as not to generate fluctuations or discontinuities in the engine output.

A control apparatus according to the present invention is a control apparatus for a vehicle that includes an engine with a turbocharger that is capable of lean-burn operation and an automatic transmission. The automatic transmission may be a stepped transmission or a continuously variable transmission. The control apparatus according to the present invention includes an engine control portion that controls the engine, and a transmission control portion that controls the automatic transmission. The engine control portion and the transmission control portion operate in conjunction to control the engine and the automatic transmission. In a case where an operation mode of the engine is transitioned from a natural aspiration lean-burn operation mode to a supercharged lean-burn operation mode, the engine control portion temporarily changes an air-fuel ratio from a lean air-fuel ratio (air-fuel ratio at which a fuel amount is leaner than in a stoichiometric air-fuel ratio) to a stoichiometric air-fuel ratio or a rich air-fuel ratio (air-fuel ratio at which a fuel amount is richer than in a the stoichiometric air-fuel ratio). The term "temporarily" refers to returning the air-fuel ratio from the stoichiometric air-fuel ratio or rich air-fuel ratio to the lean air-fuel ratio again after a certain period has elapsed. It is sufficient that the period is a period in which it is possible to increase the turbine work and raise the intake pipe pressure, and a short period is preferable from the viewpoint of fuel consumption. Furthermore, the air-fuel ratio may be returned to the lean air-fuel ratio upon the intake pipe pressure reaching the target intake pipe pressure. When the air-fuel ratio is changed from a lean air-fuel ratio to a stoichiometric air-fuel ratio or a rich air-fuel ratio by the engine control portion, the transmission control portion switches a gear ratio of the automatic transmission to a gear ratio that provides an engine rotational speed at which an engine output becomes equal to an engine output before the air-fuel ratio is changed and also at which an intake pipe pressure becomes equal to or closest to an intake pipe pressure before the air-fuel ratio is changed.

In a preferred form of the control apparatus according to the present invention, when the air-fuel ratio is changed again to a lean air-fuel ratio from a stoichiometric air-fuel ratio or a rich air-fuel ratio by the engine control portion, the transmission control portion switches a gear ratio of the automatic transmission to a gear ratio that provides an engine rotational speed at which an engine output becomes equal to an engine output before the air-fuel ratio is changed and also at which an intake pipe pressure becomes equal to or closest to an intake pipe pressure before the air-fuel ratio is changed.

Further, in a preferred form of the control apparatus according to the present invention, in a case where the operation mode of the engine is transitioned from a supercharged lean-burn operation mode to a supercharged stoichiometric-burn operation mode, the engine control portion changes the air-fuel ratio from a lean air-fuel ratio to a stoichiometric air-fuel ratio, or changes the air-fuel ratio from a lean air-fuel ratio to a rich air-fuel ratio temporarily and thereafter changes the air-fuel ratio to a stoichiometric air-fuel ratio. When the air-fuel ratio is changed from a lean air-fuel ratio to a stoichiometric air-fuel ratio or a rich air-fuel ratio by the engine control portion, the transmission control portion switches a gear ratio of the automatic transmission to a gear ratio that provides an engine rotational speed at which an engine output becomes equal to an engine output before the air-fuel ratio is changed and also at which an intake pipe pressure becomes equal to or closest to an intake pipe pressure before the air-fuel ratio is changed.

The engine of a vehicle to which the control apparatus according to the present invention is applied can include a throttle valve and a waste gate valve. In this case, in a natural aspiration region the engine control portion keeps the waste gate valve fully open and controls the intake pipe pressure by means of the throttle valve, and in a supercharging region the engine control portion keeps the throttle valve fully open and controls a supercharging pressure by means of the waste gate valve.

According to the control apparatus of the present invention, when transitioning from a natural aspiration lean-burn operation mode to a supercharged lean-burn operation mode, exhaust energy is increased by temporarily making the air-fuel ratio stoichiometric or rich, and as a result the turbine work of a turbocharger increases and the supercharging pressure and intake pipe pressure rapidly rise. In addition, the gear ratio of an automatic transmission is switched in accordance therewith and an engine rotational speed at which the engine output becomes equal to the engine output before the air-fuel ratio is changed and also at which the intake pipe pressure becomes equal to or closest to an intake pipe pressure before the air-fuel ratio is changed is assigned to the engine. By this means, the intake pipe pressure rises without undergoing a sudden change, and the occurrence of fluctuations or discontinuities in the engine output is prevented.

BRIEF DESCRIPTION OF THE DRAWINGS

FIG. 8 is a time chart illustrating control results obtained by engine-transmission control of a second embodiment of the present invention.

DETAILED DESCRIPTION OF THE EMBODIMENTS

First Embodiment

Figure 1:
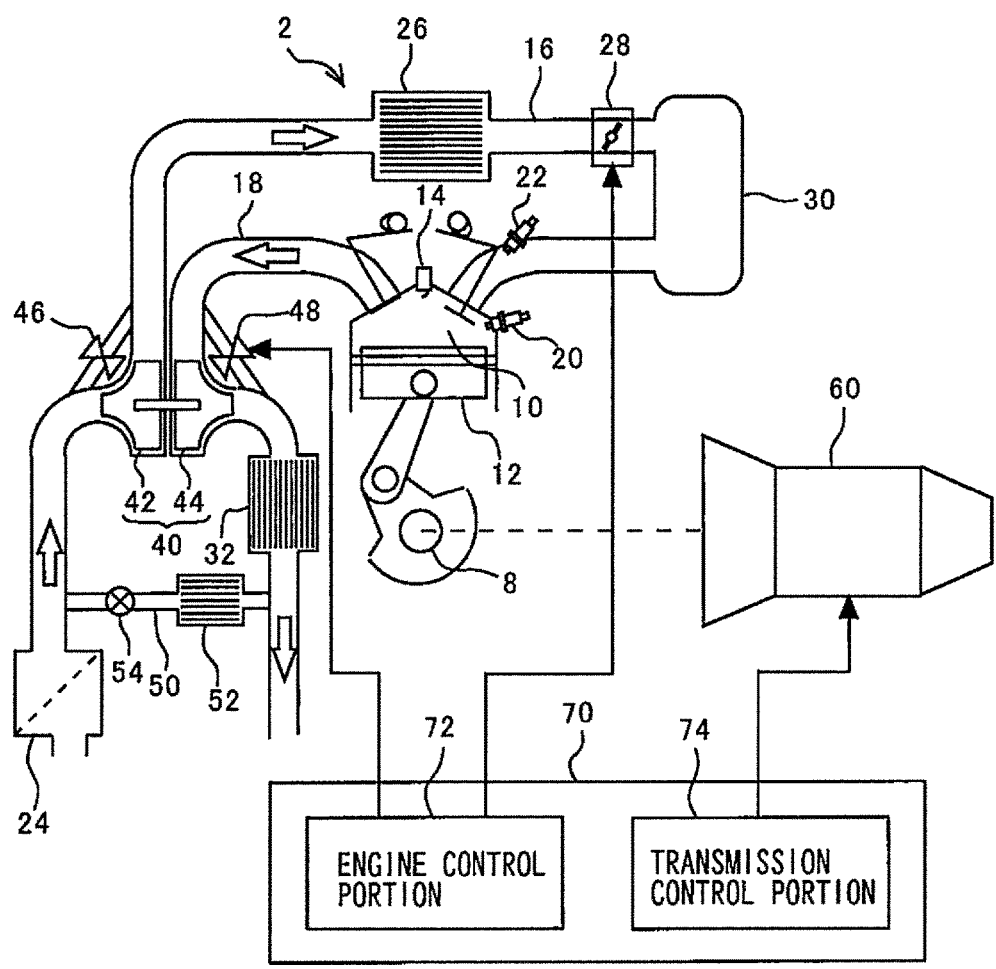
FIG. 1 is a view illustrating the configuration of a power system of a first embodiment of the present invention.

A first embodiment of the present invention will be described hereunder using the drawings.
<Power System of First Embodiment>
FIG. 1 is a view illustrating the configuration of a power system of the first embodiment. The power system illustrated in FIG. 1 is a power system for an automobile, and is constituted by an engine 2, an automatic transmission 60, and a control apparatus 70. The engine 2 is an engine with a turbocharger that is capable of lean-burn operation. The automatic transmission 60 is a stepped transmission having six or more gear stages. The control apparatus 70 is a computer that includes a memory in which a control program is stored, and a processor that reads out the control program from the memory and executes the control program. The control apparatus 70 includes an engine control portion 72 that controls the engine 2 and a transmission control portion 74 that controls the automatic transmission 60.

The engine 2 is a spark-ignition engine that includes a spark plug 14 in a combustion chamber 10 that is formed in a cylinder. The number of cylinders and the arrangement of the cylinders of the engine 2 are not particularly limited. A piston 12 of each cylinder is connected to a crankshaft 8. The crankshaft 8 is an output shaft of the engine 2, and is connected to the automatic transmission 60. A crank angle sensor that is used to measure the engine rotational speed is provided on the crankshaft 8. An intake passage 16 and an exhaust passage 18 are connected to the combustion chamber 10. An in-cylinder injection valve 20 that injects fuel directly is provided in the combustion chamber 1. A port injection valve 22 that injects fuel into an intake port is mounted in the intake passage 16.

An air cleaner 24 is provided at a most upstream part of the intake passage 16. A compressor 42 of a turbocharger 40 is disposed on a downstream side of the air cleaner 24. An air bypass valve 46 is provided in a passage that bypasses the compressor 42. A water-cooled intercooler 26 is provided on a downstream side of the compressor 42. A throttle valve 28 is provided on a downstream side of the water-cooled intercooler 26. An unshown supercharging pressure sensor for measuring a supercharging pressure is provided between the water-cooled intercooler 26 and the throttle valve 28. A degree of opening of the throttle valve 28 (degree of throttle opening) is measured by an unshown degree of throttle opening sensor. A surge tank 30 is provided on a downstream side of the throttle valve 28. An unshown intake pipe pressure sensor for measuring an intake pipe pressure is provided in the surge tank 30. An intake manifold that introduces air into each cylinder of the engine 2 is provided in the surge tank 30.

A turbine 44 of the turbocharger 40 is disposed in the exhaust passage 18. An electromagnetically-driven waste gate valve (WGV) 48 is provided in a passage that bypasses the turbine 44. A catalyst 32 having an oxygen storage capacity that is used for purifying exhaust gas is provided on a downstream side of the WGV 48. An EGR passage 50 for recirculating a part of the exhaust gas to the intake side is connected between the downstream side of the catalyst 32 in the exhaust passage 18 and the downstream side of the air cleaner 24 in the intake passage 16. An EGR cooler 52 and an EGR valve 54 are provided in the EGR passage 50.

The control apparatus 70 controls the engine 2 and the automatic transmission 60 that are configured as described above. The control apparatus 70 calculates the size of an engine output that the driver requests, based on an operation amount and an operation speed of an accelerator pedal operation. The control apparatus 70 then determines a target operating point of the engine 2 for realizing the requested engine output. A target torque and a target air-fuel ratio of the engine 2 and a gear stage of the automatic transmission 60 are associated at the target operating point. The engine control portion 72 of the control apparatus 70 performs torque control and air-fuel ratio control of the engine 2 in accordance with the target operating point. The transmission control portion 74 of the control apparatus 70 performs gear shift control of the automatic transmission 60 in accordance with the target operating point. In the torque control, control of the intake pipe pressure by operation of the throttle valve 28, and control of the supercharging pressure by operation of the WGV 48 are performed. In the air-fuel ratio control, control of a fuel injection amount is performed by operations of the in-cylinder injection valve 20 and the port injection valve 22. Further, selection of a gear stage of the automatic transmission 60 (that is, selection of a gear ratio) is performed in the gear shift control.

<Engine-Transmission Control of Comparative Example>

First, prior to describing engine-transmission control performed by the control apparatus of the first embodiment, a case in which the conventional engine-transmission control is applied to the system illustrated in FIG. 1 will be described as a comparative example.

Figure 2:
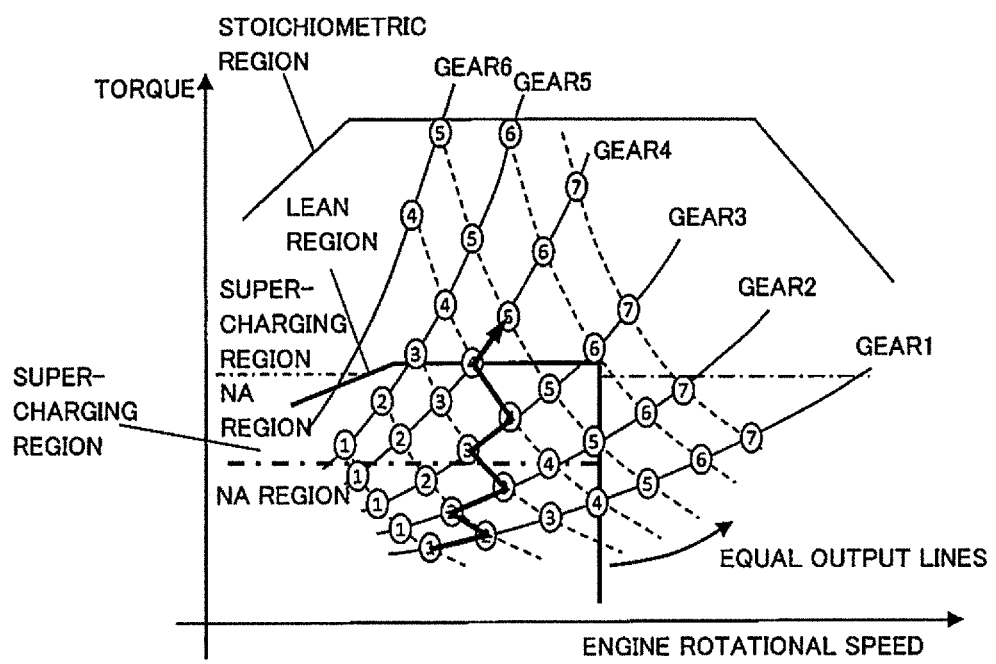
FIG. 2 is a view for describing engine-transmission control of a comparative example.

FIG. 2 is a performance graph for the engine 2 in the system illustrated in FIG. 1. In the performance graph, equal output lines along which equal engine outputs are obtained are depicted by dashed lines in a graph that adopts the torque and the engine rotational speed as axes. However, the equal output lines depicted in the graph are one example, and the intervals between the equal output lines can be narrowed and a larger number of equal output lines can be set. Further, curves (equal gear ratio lines) that show a relation between the torque and the engine rotational speed that is obtained at the respective gears (gear stages) of the automatic transmission 60 are also depicted in the graph. Gear 1 is a gear at which the gear ratio is highest, and gear 6 is a gear at which the gear ratio is lowest. Intersection points between the respective equal output lines and the respective equal gear ratio lines are operating points of the engine 2. Numerical values assigned to the respective operating points indicate the size of the engine output obtained at the relevant operating point.

The engine 2 can selectively perform lean-burn operation and stoichiometric-burn operation. A polygonal line that marks off a region in which stoichiometric-burn operation is performed (hereunder, referred to as "stoichiometric region") and a polygonal line that marks off a region in which lean-burn operation is performed (hereunder, referred to as "lean region") are depicted in the graph illustrated in FIG. 2. The stoichiometric region is a region on the side of a low engine rotational speed and a low torque with respect to the polygonal line that marks off the stoichiometric region. The lean region is a region on the side of a low engine rotational speed and a low torque with respect to the polygonal line that marks off the lean region. The lean region is set in an overlapping manner with respect to the stoichiometric region. In a region in which the lean region and the stoichiometric region overlap, one of lean-burn operation and stoichiometric-burn operation is selected with respect to the same operating point. Note that, the air-fuel ratio during lean-burn operation is set to an air-fuel ratio with a value of, for example, 20 or more.

The stoichiometric region is divided into a region in which supercharging by the turbocharger 40 is performed (hereunder, referred to as "supercharging region"), and a region in which supercharging by the turbocharger 40 is not performed (hereunder, referred to as "natural aspiration region" (described as "NA region" in the graph)). Likewise, the lean region is also divided into a supercharging region and a natural aspiration region (NA region). Note that the supercharging region is a region in which the supercharging pressure is higher than the atmospheric pressure, and the natural aspiration region is a region in which the supercharging pressure is the atmospheric pressure.

In FIG. 2, the path of operating points in a case where engine-transmission control is executed according to the comparative example is depicted to be superimposed on the performance graph of the engine 2. The path of the operating points depicted in FIG. 2 shows the manner in which, in order to increase the engine output, the operation mode of the engine 2 transitions from a natural aspiration lean-burn operation mode to a supercharged stoichiometric-burn operation mode via a supercharged lean-burn operation mode. According to the engine-transmission control of the comparative example, shifting of the operating point is performed in a manner that adopts a highest thermal efficiency point on the respective equal output lines as a target operating point.

Figure 3:
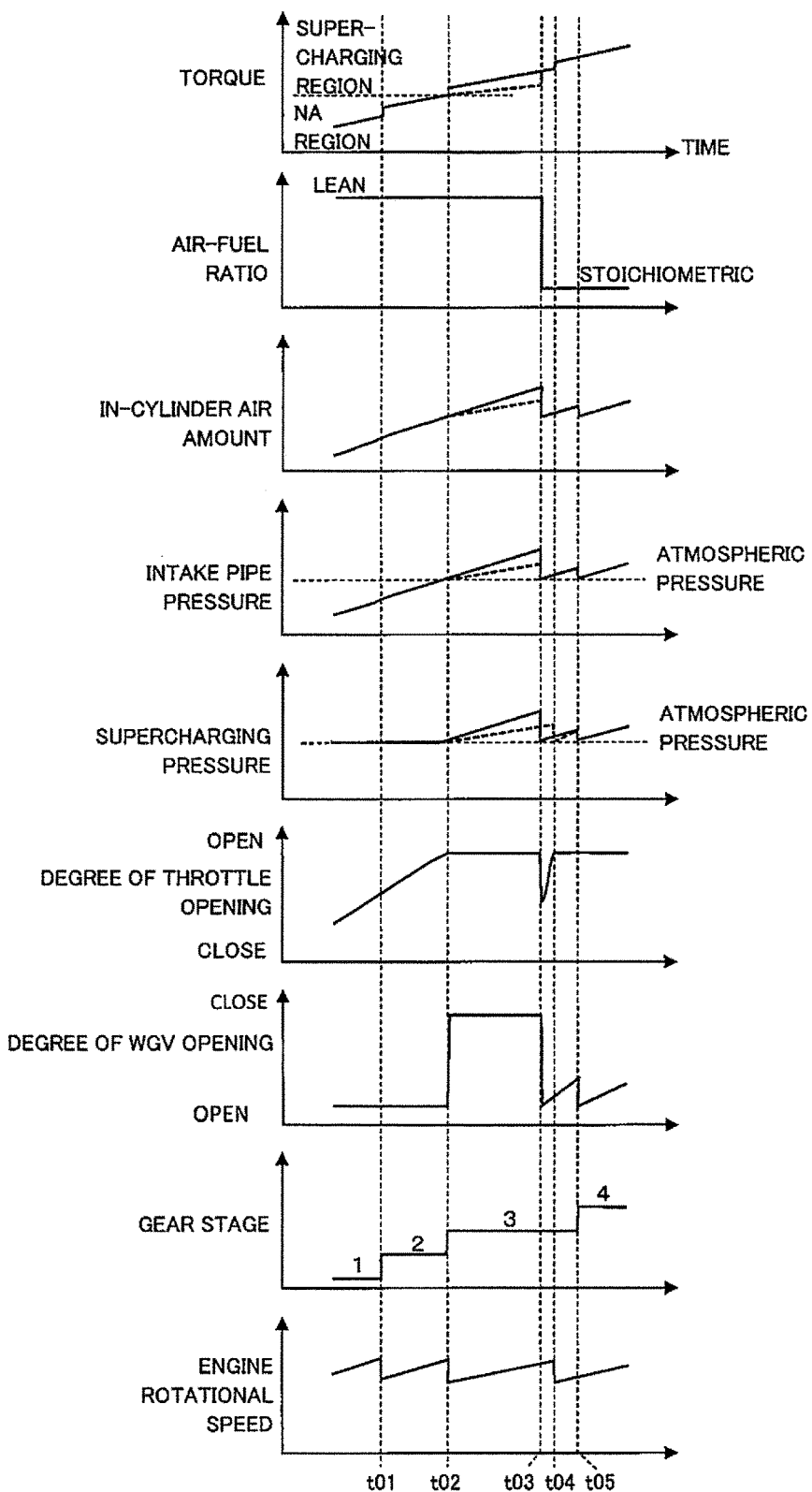
FIG. 3 is a time chart illustrating control results obtained by the engine-transmission control of the comparative example.

FIG. 3 is a time chart illustrating control results obtained by the engine-transmission control of the comparative example. In the time chart, the respective changes over time in the torque, the air-fuel ratio, the in-cylinder air amount, the intake pipe pressure, the supercharging pressure, the degree of throttle opening, the degree of WGV opening, the gear stage and the engine rotational speed are illustrated for a case in which the operation mode of the engine 2 is transitioned from the natural aspiration lean-burn operation mode to the supercharged lean-burn operation mode, and furthermore, from the supercharged lean-burn operation mode to the supercharged stoichiometric-burn operation mode. Note that, in the charts that show the respective changes over time in the torque, the in-cylinder air amount, the intake pipe pressure and the supercharging pressure, a solid line indicates a target value and a dashed line indicates an actual value. The control results shown in this time chart correspond to the path of the operating points shown in the graph in FIG. 2.

In the time chart, in accordance with an increase in the target torque, at a time point t01, the gear stage of the automatic transmission 60 is shifted up from gear 1 to gear 2. Further, at a time point t02 at which the target torque enters the supercharging region from the natural aspiration region, the gear stage is shifted up from gear 2 to gear 3. Although in the natural aspiration region the degree of WGV opening is maintained in a state corresponding to a fully open condition and the intake pipe pressure is controlled by means of the degree of throttle opening, in the supercharging region the degree of throttle opening is maintained in a state corresponding to a fully open condition and the supercharging pressure is controlled by means of the degree of WGV opening.

In this case, when attention is focused on the respective charts for the torque, the in-cylinder air amount, the intake pipe pressure and the supercharging pressure, it is found that a shortage arises in the actual values relative to the target values from the time point t02 onwards. This is because, when performing lean-burn operation, the temperature of exhaust gas is low in comparison to when performing stoichiometric-burn operation and it is therefore difficult for the turbine work to increase. In the time chart, although the degree of WGV opening corresponds to a fully open condition, the rotational speed of the turbine still does not rapidly increase, and the supercharging pressure cannot be raised rapidly. Further, because the supercharging pressure does not rise rapidly, the intake pipe pressure does not rise rapidly. Therefore, since the in-cylinder air amount also does not increase rapidly because the intake pipe pressure does not rise rapidly, the actual torque is insufficient relative to the target torque.

Further, in the time chart, at a time point t03, while maintaining the gear stage at gear 3, the air-fuel ratio is changed from a lean air-fuel ratio to a stoichiometric air-fuel ratio. Although an increase in the turbine work is facilitated by making the air-fuel ratio the stoichiometric air-fuel ratio, the torque becomes excessive if the air-fuel ratio is merely made the stoichiometric air-fuel ratio. Consequently, when transitioning to the supercharged stoichiometric-burn operation mode, the degree of WGV opening is made a degree that corresponds to a fully open condition and the supercharging pressure is lowered. However, because of a response delay in the supercharging pressure, the actual supercharging pressure is excessive relative to the target supercharging pressure. Therefore, the degree of throttle opening is temporarily reduced in order to make the intake pipe pressure match the target intake pipe pressure.

As described above, according to the engine-transmission control of the comparative example, a response delay arises with respect to the torque when transitioning from the natural aspiration lean-burn operation mode to the supercharged lean-burn operation mode. In addition, when transitioning from the supercharged lean-burn operation mode to the supercharged stoichiometric-burn operation mode, it is necessary to perform complicated air amount control by operations of the throttle valve 28 and the WGV 48. In this complicated air amount control, there is a risk that it will not be possible to cause the actual torque to match the target torque as the result of various kinds of response delays overlapping. That is, in the engine-transmission control of the comparative example, there is a risk that a response delay or a deviation in the actual torque relative to the target torque will arise when switching the operation mode of the engine 2. Such response delays or deviations generate fluctuations or discontinuities in the engine output, and cause the drivability of the vehicle to deteriorate.

<Engine-Transmission Control of First Embodiment>

Figure 4:
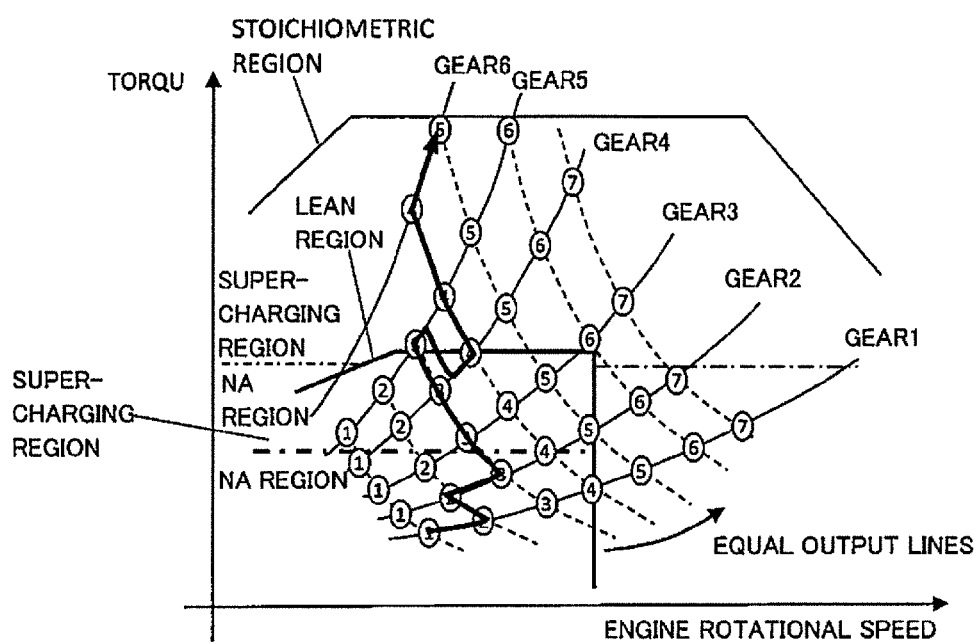
FIG. 4 is a view for describing engine-transmission control of the first embodiment of the present invention.

Next, engine-transmission control performed by the control apparatus of the first embodiment will be described. In FIG. 4, a path of operating points in a case where the engine-transmission control of the first embodiment is executed is depicted to be superimposed on a performance graph of the engine 2. Since the performance graph of the engine 2 is common with the performance graph of the comparative example, a description thereof is omitted here.

In the engine-transmission control of the comparative example, shifting of the operating point is performed in a manner that adopted a highest thermal efficiency point on the respective equal output lines as a target operating point. However, in the engine-transmission control of the first embodiment, when transitioning the operation mode of the engine 2 from the natural aspiration lean-burn operation mode to the supercharged lean-burn operation mode in accordance with an increase in the requested output, the air-fuel ratio is temporarily made a stoichiometric air-fuel ratio. That is, temporary switching of the operation mode of the engine 2 to the supercharged stoichiometric-burn operation mode is performed. In addition, at such time, the air-fuel ratio is not merely made stoichiometric, but rather selection of a target operating point is performed so that the engine outputs before and after the air-fuel ratio is made stoichiometric become equal and also so that the intake pipe pressures before and after the air-fuel ratio is made stoichiometric become equal (or so that a difference therebetween is minimized). In this case, the term "so that a difference between the intake pipe pressures before and after the air-fuel ratio is made stoichiometric is minimized" means that in a case where an operating point at which an equal intake pipe pressure is obtained is not present at an intersection point between an equal output line and an equal gear ratio line, an intersection point at which an intake pipe pressure that is closest to the intake pipe pressure before the air-fuel ratio is made stoichiometric among the intersection points is selected as the target operating point. In FIG. 4, an operating point at an intersection point between an equal output line denoted by numerical values 3 and an equal gear ratio line of gear 5 corresponds thereto. By controlling the engine 2 to this operating point by controlling the gear ratio of the automatic transmission 60 (in FIG. 4, by shifting the gear stage up from gear 2 to gear 5), a rotational speed at which the engine output becomes equal to the engine output before the air-fuel ratio is made stoichiometric and at which the intake pipe pressure becomes equal to or closest to the intake pipe pressure before the air-fuel ratio is made stoichiometric can be assigned to the engine 2. This kind of gear shift control of the automatic transmission 60 is referred to as "equal intake pipe pressure gear shift control".

By temporarily making the air-fuel ratio stoichiometric, the exhaust energy increases and the supercharging pressure rises. In the engine-transmission control of the first embodiment, the air-fuel ratio is made lean again at a time point at which the supercharging pressure rises and the actual intake pipe pressure becomes substantially equal to the target intake pipe pressure. That is, the operation mode of the engine 2 is returned to the supercharged lean-burn operation mode. The reason is that it is preferable from the viewpoint of fuel consumption to increase the opportunities to perform lean-burn operation as much as possible. In addition, at such time, the air-fuel ratio is not merely made lean, but rather selection of a target operating point is performed so that the engine outputs before and after the air-fuel ratio is made lean become equal and so that the intake pipe pressures before and after the air-fuel ratio is made lean also become equal (or so that a difference therebetween is minimized). In FIG. 4, an unshown equal output line is set between the equal output line denoted by the numerical values 3 and an equal output line denoted by the numerical values 4, and an intersection point between the unshown equal output line and the equal gear ratio line of gear 4 is selected as a target operating point. By controlling the engine 2 to this operating point by means of the equal intake pipe pressure gear shift control of the automatic transmission 60 (in FIG. 4, by shifting the gear stage down from gear 5 to gear 4), a rotational speed at which the engine output becomes equal to the engine output before the air-fuel ratio is made lean and at which the intake pipe pressure becomes equal to or closest to the intake pipe pressure before the air-fuel ratio is made lean can be assigned to the engine 2.

In accordance with a further increase in the requested output, the operation mode of engine 2 is transitioned from the supercharged lean-burn operation mode to the supercharged stoichiometric-burn operation mode. At such time, according to the engine-transmission control of the first embodiment, the air-fuel ratio is not merely made stoichiometric, but rather selection of a target operating point is performed so that the engine outputs before and after the air-fuel ratio is made stoichiometric become equal and also so that the intake pipe pressures before and after the air-fuel ratio is made stoichiometric become equal (or so that a difference therebetween is minimized). In FIG. 4, an operating point at an intersection point between the equal output line denoted by the numerical values 4 and an equal gear ratio line of gear 6 corresponds thereto. By controlling the engine 2 to this operating point by means of the equal intake pipe pressure gear shift control of the automatic transmission 60 (in FIG. 4, by shifting the gear stage up from gear 4 to gear 6), a rotational speed at which the engine output becomes equal to the engine output before the air-fuel ratio is made stoichiometric and at which the intake pipe pressure becomes equal to or closest to the intake pipe pressure before the air-fuel ratio is made stoichiometric can be assigned to the engine 2.

Figure 5:
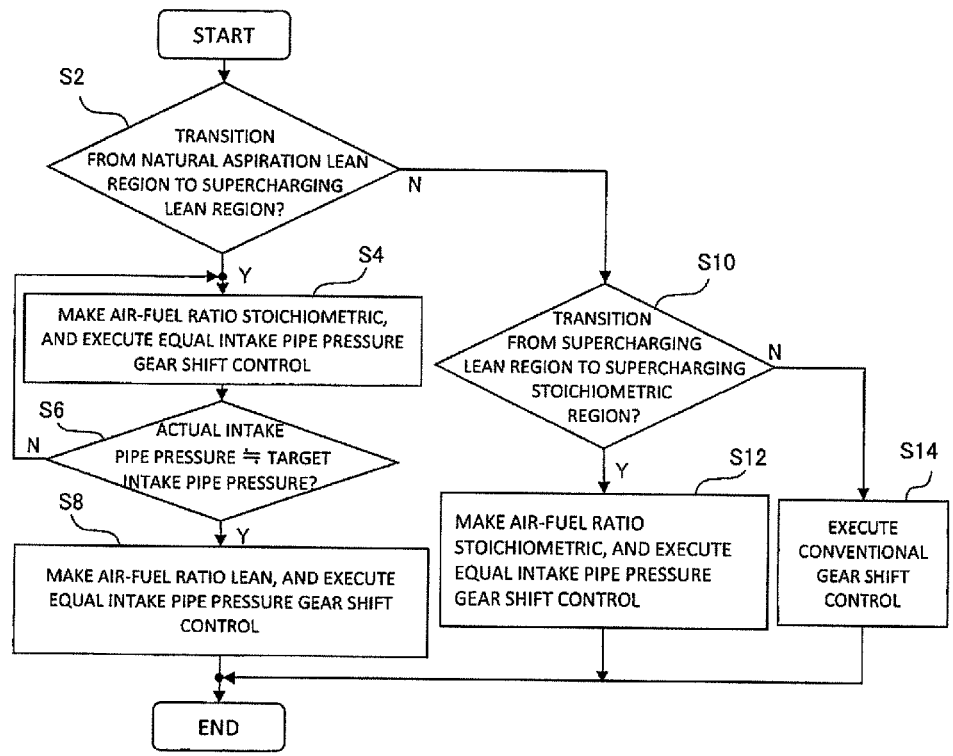
FIG. 5 is a flowchart of the engine-transmission control executed in the first embodiment of the present invention.

FIG. 5 is a flowchart illustrating a routine of engine-transmission control executed by the control apparatus 70 in the first embodiment. In step S2 of the present routine, the control apparatus 70 determines whether or not to transition the operation mode of the engine 2 from the natural aspiration lean-burn operation mode to the supercharged lean-burn operation mode. That is, in a case where the current operating point is in the natural aspiration lean region and the target operating point is in the supercharging lean region, the control apparatus 70 makes a determination to transition the operation mode to the supercharged lean-burn operation mode. If the result determined in step S2 is affirmative, in step S4 the control apparatus 70 performs operations to make the air-fuel ratio stoichiometric and also executes the equal intake pipe pressure gear shift control. In step S6, the control apparatus 70 determines whether or not the actual intake pipe pressure is substantially equal to the target intake pipe pressure. The control apparatus 70 can determine whether or not the aforementioned pressures are substantially equal by determining whether or not a difference between the actual intake pipe pressure and the target intake pipe pressure is less than a predetermined threshold value. The control apparatus 70 continues to make the air-fuel ratio stoichiometric until the result determined in step S6 is affirmative. Subsequently, when the result determined in step S6 is affirmative, in step S8 the control apparatus 70 performs operations to make the air-fuel ratio lean again and also executes the equal intake pipe pressure gear shift control.

If the result determined in step S2 is negative, in step S10, the control apparatus 70 determines whether or not to transition the operation mode of the engine 2 from the supercharged lean-burn operation mode to the supercharged stoichiometric-burn operation mode. If the result determined in step S10 is affirmative, in step S12, the control apparatus 70 performs operations to make the air-fuel ratio stoichiometric and also executes the equal intake pipe pressure gear shift control. In contrast, if the result determined in step S10 is also negative in addition to the result determined in step S2, in step S14 the control apparatus 70 executes the conventional gear ratio control. As described above in the comparative example, in the conventional gear ratio control, switching of gear stages is performed so that the operating point of the engine 2 moves to the highest thermal efficiency point on the respective equal output lines.

Figure 6:
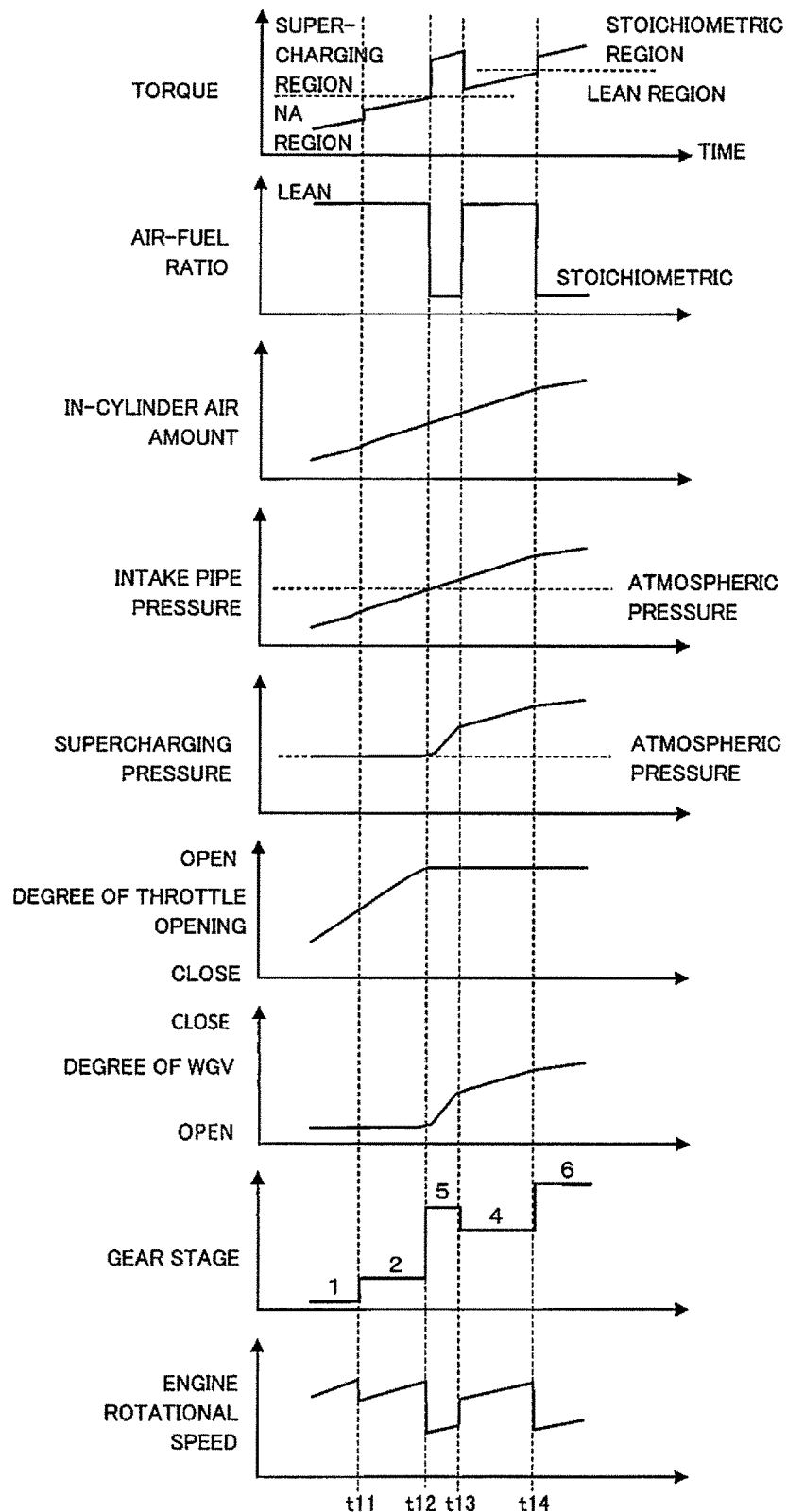
FIG. 6 is a time chart illustrating control results obtained by the engine-transmission control of the first embodiment of the present invention.

FIG. 6 is a time chart illustrating control results obtained by the engine-transmission control of the first embodiment. In the time chart, the respective changes over time in the torque, the air-fuel ratio, the in-cylinder air amount, the intake pipe pressure, the supercharging pressure, the degree of throttle opening, the degree of WGV opening, the gear stage and the engine rotational speed are illustrated for a case where the operation mode of the engine 2 is transitioned from the natural aspiration lean-burn operation mode to the supercharged lean-burn operation mode, and furthermore, from the supercharged lean-burn operation mode to the supercharged stoichiometric-burn operation mode. The control results shown in this time chart correspond to the path of the operating points shown in the graph in FIG. 4.

In the time chart illustrated in FIG. 6, in accordance with an increase in the target torque, at a time point t11, the gear stage of the automatic transmission 60 is shifted up from gear 1 to gear 2. Thereafter, the target torque enters the supercharging region from the natural aspiration region at a time point t12, and according to the engine-transmission control of the first embodiment the air-fuel ratio is changed to the stoichiometric air-fuel ratio at that time point. Further, from the time point t12 onwards, the throttle valve 28 is kept fully open and supercharging pressure control is executed by means of the WGV 48. Since the energy imparted to the exhaust gas increases as the result of changing the air-fuel ratio to the stoichiometric air-fuel ratio, the responsiveness of the supercharging pressure to a change in the degree of WGV opening increases, and the supercharging pressure and the intake pipe pressure rise rapidly from the time point at which the supercharging region is entered.

Further, simultaneously with changing the air-fuel ratio to the stoichiometric air-fuel ratio, the gear stage of the automatic transmission 60 is shifted up from gear 2 to gear 5 and the engine rotational speed is thereby lowered. Because the engine rotational speed is lowered in accompaniment with an increase in the torque that is caused by changing the air-fuel ratio to the stoichiometric air-fuel ratio, the engine output is kept constant. Furthermore, the engine rotational speed attained by gear 5 that is selected in this case is an engine rotational speed at which the engine output becomes equal to the engine output before the air-fuel ratio is changed to the stoichiometric air-fuel ratio and at which the intake pipe pressure becomes equal to or closest to the intake pipe pressure before the air-fuel ratio is changed to the stoichiometric air-fuel ratio. By this means, the intake pipe pressure rises without undergoing a sudden change even after entering the supercharging region, and the occurrence of fluctuations or discontinuities in the engine output is suppressed.

According to the time chart shown in FIG. 6, thereafter, at a time point t13, the air-fuel ratio is returned from the stoichiometric air-fuel ratio to the lean air-fuel ratio. As described with respect to the above flowchart, whether or not to make the air-fuel ratio lean is determined based on whether or not the actual intake pipe pressure has becomes substantially equal to the target intake pipe pressure. Furthermore, concurrently therewith, the gear stage of the automatic transmission 60 is shifted down from gear 5 to gear 4 to cause the engine rotational speed to increase. The engine rotational speed attained by gear 4 that is selected in this case is an engine rotational speed at which the engine output becomes equal to the engine output before the air-fuel ratio is made lean, and at which the intake pipe pressure becomes equal to or closest to the intake pipe pressure before the air-fuel ratio is made lean. By this means, the occurrence of fluctuations or discontinuities in the engine output accompanying return of the air-fuel ratio to a lean air-fuel ratio are suppressed.

In the time chart in FIG. 6, thereafter, at a time point t14, the target torque enters the stoichiometric region from the lean region. According to the engine-transmission control of the first embodiment, simultaneously with the air-fuel ratio changing to the stoichiometric air-fuel ratio, the gear stage is shifted up from gear 4 to gear 6 and the engine rotational speed is thereby lowered. The engine rotational speed attained by gear 6 that is selected in this case is an engine rotational speed at which the engine output becomes equal to the engine output before the air-fuel ratio is changed to the stoichiometric air-fuel ratio, and at which the intake pipe pressure becomes equal to or closest to the intake pipe pressure before the air-fuel ratio is changed to the stoichiometric air-fuel ratio. By this means, the occurrence of fluctuations or discontinuities in the engine output accompanying the changing of the air-fuel ratio to the stoichiometric air-fuel ratio is suppressed.

As described above, according to the engine-transmission control of the first embodiment, the occurrence of fluctuations or discontinuities in the engine output can be suppressed during a series of processes in which the operation mode of the engine 2 transitions from the natural aspiration lean-burn operation mode to the supercharged stoichiometric-burn operation mode via the supercharged lean-burn operation mode. Further, after transitioning from the natural aspiration region to the supercharging region, the throttle valve 28 is kept fully open and the supercharging pressure is controlled by only operating the WGV 48, and consequently an in-cylinder air amount can be controlled. That is, according to the engine-transmission control of the first embodiment, air amount control in a supercharging region can be simplified in comparison to the conventional engine-transmission control.

<Modification Example of Engine-Transmission Control of First Embodiment>

Figure 7:
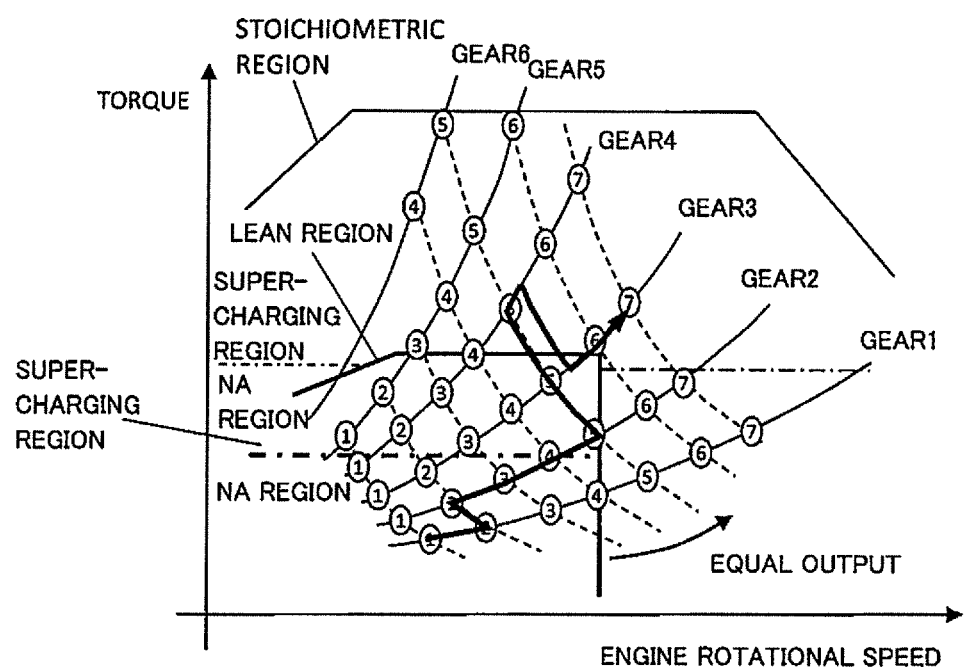
FIG. 7 is a view for describing a modification example of the engine-transmission control of the first embodiment of the present invention.

Next, a modification example of the engine-transmission control performed by the control apparatus of the first embodiment will be described. In FIG. 7, a path of operating points in a case where the modification example of the engine-transmission control of the first embodiment is executed is depicted to be superimposed on the performance graph of the engine 2. A difference between the first embodiment and the modification example is the range of usage of the engine rotational speed. As will be understood by comparing the path of operating points shown in FIG. 4 and the path of operating points shown in FIG. 7, in the modification example the range of usage of the engine rotational speed is broadened to raise the engine output during lean-burn operation. According to the modification example, the frequency of using lean-burn operation can be increased.

Second Embodiment

Next, a second embodiment of the present invention will be described referring to the drawings.

<Power System of Second Embodiment>

Similarly to the first embodiment, the power system of the second embodiment is illustrated in FIG. 1. However, in the second embodiment the automatic transmission 60 is taken as being a continuously variable transmission (CVT) and not a stepped transmission. The remaining configuration is common with the first embodiment.

<Modification Example of Engine-Transmission Control of Second Embodiment>

The contents of the engine-transmission control executed in the second embodiment are common with the engine-transmission control of the first embodiment. However, because the automatic transmission 60 in the system of the first embodiment is a stepped transmission, it is not necessarily the case that an engine rotational speed at which the intake pipe pressure becomes equal to the intake pipe pressure before the air-fuel ratio is changed can always be realized during the equal intake pipe pressure gear shift control. In such a case, a gear ratio (that is, a gear stage) is selected that provides an engine rotational speed that realizes the closest intake pipe pressure to the intake pipe pressure before the air-fuel ratio is changed. In contrast, because the automatic transmission 60 in the system of the second embodiment is a continuously variable transmission, the gear ratio can be controlled so as to provide an engine rotational speed that realizes an intake pipe pressure that is equal to the intake pipe pressure before the air-fuel ratio is changed.

FIG. 8 is a time chart illustrating control results obtained by the engine-transmission control of the second embodiment. In the time chart, the respective changes over time in the torque, the air-fuel ratio, the in-cylinder air amount, the intake pipe pressure, the supercharging pressure, the degree of throttle opening, the degree of WGV opening, the gear ratio and the engine rotational speed are illustrated for a case where the operation mode of the engine 2 is transitioned from the natural aspiration lean-burn operation mode to the supercharged lean-burn operation mode, and furthermore, from the supercharged lean-burn operation mode to the supercharged stoichiometric-burn operation mode. The air-fuel ratio is changed to the stoichiometric air-fuel ratio at a time point t21 at which the target torque enters the supercharging region from the natural aspiration region. Subsequently, after a certain period elapses, at a time point t22, the air-fuel ratio is returned to the lean air-fuel ratio. Thereafter, the air-fuel ratio is changed to the stoichiometric air-fuel ratio at a time point t23 at which the target torque enters the stoichiometric region from the lean region. As shown in this time chart, according to the second embodiment the intake pipe pressure and the in-cylinder air amount can be increased more smoothly over the entire area.

Other Embodiments

The present invention is not limited to the above described embodiments, and various modifications can be made without departing from the spirit and scope of the present invention. For example, in the case of transitioning the operation mode of the engine from the natural aspiration lean-burn operation mode to the supercharged lean-burn operation mode, a configuration may also be adopted that temporarily changes the air-fuel ratio from a lean air-fuel ratio to a rich air-fuel ratio. During lean-burn operation, since the catalyst 32 occludes oxygen and enters a saturated state, the catalyst 32 can be caused to discharge oxygen and the catalyst function can be restored by temporarily changing the air-fuel ratio a rich air-fuel ratio. Note that, the air-fuel ratio may be changed to a rich air-fuel ratio during the entire period in which the air-fuel ratio is being temporarily changed from the lean air-fuel ratio, or the air-fuel ratio may be changed to a rich air-fuel ratio for a limited period. In the latter case, a configuration may be adopted in which the air-fuel ratio is changed to the stoichiometric air-fuel ratio after a predetermined time period has elapsed after the air-fuel ratio is changed from the lean air-fuel ratio to the rich air-fuel ratio, and is thereafter returned to the lean air-fuel ratio from the stoichiometric air-fuel ratio. Alternatively, a configuration may be adopted in which the air-fuel ratio is changed to the stoichiometric air-fuel ratio at a time point at which the oxygen that has been occluded in the catalyst 32 has been released. The foregoing also similarly applies to a case in which the operation mode of the engine is transitioned from the supercharged lean-burn operation mode to the supercharged stoichiometric-burn operation mode, and a configuration may be adopted in which the air-fuel ratio is temporarily changed from the lean air-fuel ratio to the rich air-fuel ratio, and is thereafter changed to the stoichiometric air-fuel ratio.

The invention claimed is:

1. A control apparatus for a vehicle, the vehicle includes an engine having a turbocharger and an automatic transmission, the engine capable of lean-burn operation, comprising:
   an engine control portion that controls the engine, and
   a transmission control portion that controls the automatic transmission,
   wherein:
   in a case where an operation mode of the engine is transitioned from a natural aspiration lean-burn operation mode to a supercharged lean-burn operation mode, the engine control portion temporarily changes an air-fuel ratio from a lean air-fuel ratio to a stoichiometric air-fuel ratio or a rich air-fuel ratio, and
   when the air-fuel ratio is changed from the lean air-fuel ratio to the stoichiometric air-fuel ratio or the rich air-fuel ratio by the engine control portion, the transmission control portion switches a gear ratio of the automatic transmission to a gear ratio that provides an engine rotational speed at which an engine output torque becomes equal to an engine output torque before the air-fuel ratio is changed and also at which an intake pipe pressure becomes equal to or closest to an intake pipe pressure before the air-fuel ratio is changed.

2. The control apparatus according to claim 1, wherein, when the air-fuel ratio is changed again to the lean air-fuel ratio from the stoichiometric air-fuel ratio or the rich air-fuel ratio by the engine control portion, the transmission control portion switches the gear ratio of the automatic transmission to a gear ratio that provides the engine rotational speed at which the engine output torque becomes equal to the engine output torque before the air-fuel ratio is changed and also at which the intake pipe pressure becomes equal to or closest to the intake pipe pressure before the air-fuel ratio is changed.

3. The control apparatus according to claim 1, wherein:
in a case where the operation mode of the engine is transitioned from the supercharged lean-burn operation mode to the supercharged stoichiometric-burn operation mode, the engine control portion changes the air-fuel ratio from the lean air-fuel ratio to the stoichiometric air-fuel ratio, or changes the air-fuel ratio from the lean air-fuel ratio to the rich air-fuel ratio temporarily and thereafter changes the air-fuel ratio to the stoichiometric air-fuel ratio, and when the air-fuel ratio is changed from the lean air-fuel ratio to the stoichiometric air-fuel ratio or the rich air-fuel ratio by the engine control portion, the transmission control portion switches the gear ratio of the automatic transmission to the gear ratio that provides the engine rotational speed at which the engine output torque becomes equal to the engine output torque before the air-fuel ratio is changed and also at which the intake pipe pressure becomes equal to or closest to the intake pipe pressure before the air-fuel ratio is changed.

4. The control apparatus according to claim 1, wherein:
the engine comprises a throttle valve and a waste gate valve, and
in a natural aspiration region the engine control portion keeps the waste gate valve fully closed and controls the intake pipe pressure by the throttle valve, and in a supercharging region the engine control portion keeps the throttle valve fully open and controls a supercharging pressure by means of the waste gate valve.

5. The control apparatus according to claim 1, wherein:
the engine control portion effects a temporary change in the air-fuel ratio by, after changing the air-fuel ratio from the lean air-fuel ratio to the stoichiometric air-fuel ratio or the rich air-fuel ratio, returning the air-fuel ratio to the lean air-fuel ratio again at a time that the intake pipe pressure reaches a target intake pipe pressure.

6. The control apparatus according to claim 1, wherein:
the automatic transmission is a continuously variable transmission, and when the air-fuel ratio is changed by the engine control portion, the transmission control portion switches the gear ratio of the automatic transmission to the gear ratio that provides the engine rotational speed at which the engine output torque becomes equal to the engine output torque before the air-fuel ratio is changed and also at which the intake pipe pressure becomes equal to the intake pipe pressure before the air-fuel ratio is changed.

* * * * *